United States Patent
Zacharias et al.

(10) Patent No.: US 10,632,695 B2
(45) Date of Patent: Apr. 28, 2020

(54) FIBROUS-PREFORM CONVEYING DEVICE

(71) Applicant: Deutsches Zentrum fuer Luft- und Raumfahrt e.V., Cologne (DE)

(72) Inventors: Fabian Zacharias, Dresden (DE); Yannis Grohmann, Hamburg (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 844 days.

(21) Appl. No.: 14/585,775

(22) Filed: Dec. 30, 2014

(65) Prior Publication Data
US 2016/0185014 A1 Jun. 30, 2016

(51) Int. Cl.
| | | |
|---|---|---|
| *B29C 35/02* | (2006.01) | |
| *B29C 70/50* | (2006.01) | |
| *B29C 31/08* | (2006.01) | |
| *B29B 13/02* | (2006.01) | |
| *B29K 105/08* | (2006.01) | |
| *B29B 11/16* | (2006.01) | |

(52) U.S. Cl.
CPC .......... *B29C 70/504* (2013.01); *B29B 13/023* (2013.01); *B29C 31/08* (2013.01); *B29C 35/0272* (2013.01); *B29B 11/16* (2013.01); *B29C 35/0277* (2013.01); *B29C 2035/0211* (2013.01); *B29K 2105/0872* (2013.01)

(58) Field of Classification Search
None
See application file for complete search history.

(56) References Cited

U.S. PATENT DOCUMENTS

| | | | | |
|---|---|---|---|---|
| 2,721,925 | A * | 10/1955 | Langer | B29C 65/32 156/168 |
| 3,644,698 | A * | 2/1972 | Metcalfe | B23K 11/06 219/117.1 |
| 2013/0164133 | A1* | 6/2013 | Grove-Nielsen | F03D 11/0025 416/95 |

FOREIGN PATENT DOCUMENTS

| | | |
|---|---|---|
| DE | 10353070 A1 | 6/2005 |
| DE | 102006060361 A1 | 6/2008 |
| DE | 102009008329 A1 | 8/2010 |
| EP | 0312993 A2 | 4/1989 |
| EP | 2274154 A1 | 1/2011 |
| FR | 1134871 A | 4/1957 |
| GB | 770653 A | 3/1957 |
| WO | 0230657 A1 | 4/2002 |
| WO | WO-02-30657 * | 4/2002 |

* cited by examiner

*Primary Examiner* — Matthew J Daniels
*Assistant Examiner* — Mohammad M Ameen
(74) *Attorney, Agent, or Firm* — W & C IP (57) ABSTRACT

The invention relates to a fibrous-preform conveying device for conveying fibrous preforms, wherein at least one contact roller which on its circumferential face displays an electrode and/or counter electrode is provided, such that an electric contact with the fibrous preform to be conveyed is achieved in order to initiate a current flow in the fibrous preform when the fibrous preform is conveyed in the conveying direction.

10 Claims, 6 Drawing Sheets

FIBROUS-PREFORM CONVEYING DEVICE

The invention relates to a fibrous-preform conveying device for conveying fibrous preforms in a conveying direction. The invention likewise relates to a method therefor.

Components made from a fiber-composite material, so-called fiber-composite structures, are now unimaginable in the present-day aerospace industry. Materials of this type, however, are also becoming increasingly popular in the automotive field. On account of the high strength and rigidity specific to the weight at minimal weight, in particular critical structural elements are made from fiber-reinforced plastics. On account of the anisotropic properties of the fiber-composite materials, which result from the fiber orientation, components can be adapted to precise localized loads and thus enable an optimal use of materials in the sense of lightweight construction.

In the production process of fiber composites, besides dry fiber preforms, such as, for example, cross-laid structures or fabrics, also so-called prepregs (fibrous preforms which are pre-impregnated using a matrix material) are employed. On account of the ever increasing production runs in the production of fiber-reinforced components, in particular in mass production, great efforts are being made toward largely automating the manufacturing process, without negatively influencing the quality of the manufacturing process or of the components to be manufactured, respectively.

In order for the component to be manufactured to obtain the desired component shape, the fibrous preforms can by modification of their geometry be brought into a shape which on its own or by assembling a plurality of shaped fibrous preforms forms the desired component shape. For example, DE 10 2009 008 329 B4 discloses a preform device by way of which the preforming step can be performed in a semi-automatic or fully automatic manner. To this end, a planar fibrous preform is infed to a shearing device which displays a conical roller or a conical roller pair, respectively, such that on account of the differential of the circumferential speeds shearing of the fibrous preform is initiated. On account thereof, a production step can be brought into the desired shape in a quality-assured manner.

In the case of comparatively large components, such as wing shells or rotor blades of wind-energy plants, for example, it is in most cases necessary for the fibrous preforms which are provided as material sold by the meter to be bonded to one another or fixed to one another, respectively, in the case of a multi-layered construction, in order to avoid shifting or displacing of the fibrous preforms which are deposited in a highly precise manner. This issue becomes more pressing when the fibrous preforms are to be deposited onto a vertically installed molding tool.

Binder materials which are already contained in the fibrous preforms or are additionally introduced into the fibrous shapes, for example during preforming, are suitable for fixing dry fibrous preforms, for example. By way of introducing thermal energy into the dry fibrous preforms, these binder materials may then be thermally activated, which initiates bonding of the individual fibrous preforms.

Besides this, in particular in the case of already pre-impregnated fibrous preforms (prepregs), there is often the requirement for the fibrous preforms to be consolidated in a particular shape, in order for them to be able to be supplied to further processing or the further production steps, respectively. Here, thermal energy is introduced into the fibrous preform, on account of which a material contained in the fibrous preform is thermally activated and thus imparts to the fibrous preform a significant increase in rigidity. Such a consolidation may take place, for example, by activating a thermally activatable binder material. However, it is also conceivable for the matrix material contained in the fibrous preform to carry out a first cross-linking reaction by virtue of the introduction of thermal energy which then leads to the desired rigidity, without the component completely curing.

In particular in the case of prepregs, a shape of the fibrous preform manufactured during preforming can thus be fixed with the aid of consolidation such that there is no risk during the further production steps of the preshaped fibrous preform losing its shape.

DE 103 53 070 A1 discloses a method and a device for activating the binders of fibrous preforms, in which two electrodes which are in contact with particularly the outer peripheral regions of the preform are provided in the molding tool. Once a voltage is now applied to the electrodes, a current flow through the preform takes place, leading to heating and thus to an activation of the binder. However, it is disadvantageous here that the entire preform is to be heated, leading to large current flows in particular in the case of a preform having a large layered construction. This is owing to the fact that, on account of the arrangement of the electrodes in the molding tool, the current flow typically takes place through the lower fibrous-preform layers, such that an activation of the binder in higher fibrous-preform layers can only be achieved by way of high heat radiation of the lower layers and thus by a high current flow.

DE 10 2008 020 564 A1 discloses a tape-laying device in which the contact roller is configured such that with the aid of infrared radiation or induction the deposited fiber tapes are able to be impinged with thermal energy.

With a view to the automated manufacturing of fiber-composite structures it is necessary for the production process to be designed in a quality-assured manner. It is thus an object of the present invention to provide an improved device and an improved method by which during conveying or transportation, respectively, of fibrous preforms, for example during preforming or during consolidation, defined thermal energy can be introduced into the fibrous preforms to be conveyed, such that this intermediate step in the entire production process is reproducible having assured quality which is repeatable.

The object is achieved according to the invention by a fibrous-preform conveying device and a method for conveying fibrous preforms.

Hence, according to the invention a fibrous-preform conveying device for conveying fibrous preforms in a conveying direction, which displays a material marshaling installation which is equipped for marshaling fibrous preforms to be conveyed, is provided. The fibrous-preform conveying device according to the invention furthermore displays at least one fibrous-preform contact roller which with part of its circumferential face bears on a fibrous preform to be conveyed, when the fibrous preform is conveyed in the conveying direction through the fibrous-preform conveying device. The fibrous-preform contact roller(s) is (are) preferably rotatably mounted.

In order to now introduce thermal energy into the fibrous preform, the at least one fibrous-preform contact roller on its circumferential face displays at least one electric electrode which, for applying an electric voltage, is connectable to an electric power source, and which interacts in such a manner with at least one counter electrode which is likewise electrically contactable with the fibrous preform to be conveyed that, when an electric voltage is applied, between the electrode and the counter electrode current flow is initiated through the portion of the fibrous preform to be conveyed, which is defined by the respective contact, when the fibrous preform is conveyed in the conveying direction.

By way of the defined current flow between the electrode and the counter electrode in the fibrous preform to be conveyed, a thermal power loss on account of the electric resistance of the electrically conductive fibrous preforms, such as, for example, carbon-fiber reinforced fibrous preforms, is generated in the preform to be conveyed, such that the fibrous preform is heated in the portion defined by the electrode and the counter electrode. Depending on the arrangement of the electrode and the counter electrode, the current flow can be initiated in the fiber direction or so as to be transverse to the fiber direction.

In a first embodiment, the counter electrode is not a component part of the fibrous-preform conveying device. In further advantageous embodiments, the fibrous-preform conveying device moreover may also display the counter electrode.

The term "conveying" in the sense of the fibrous-preform conveying device according to the invention is substantially to be understood as transporting fibrous preforms, in particular planar fibrous preforms, in a conveying direction within a space of time. By way of conveying the fibrous preforms, for example preforming can be carried out on the fibrous preforms to be conveyed, for example by means of a conical roller. It is also conceivable for a laminated construction of a plurality of fibrous preforms to be generated during conveying of the fibrous preforms, by way of which a corresponding current flow by means of the fibrous-preform contact roller is then initiated.

The term "conveying" is also to be understood as intermittent conveying, in particular, in which the movement of the fibrous preform during conveying does not mandatorily have to be constant and may optionally even be stopped for a certain time. In this manner, it is conceivable for the movement to be stopped, the current flow to be generated, and the movement of the fibrous preform to be then continued, for example.

A roller in the sense of the present invention is to be understood to be a rotatably mounted body which displays a circular cross section. This may be a cylindrical or a conoid body, for example. A contact roller in the sense of the present invention moreover is also to be understood as a profiled body of which the circumferential face displays profiling for deforming the fibrous preform to be conveyed.

The inventors here have realized that by means of the fibrous-preform conveying device according to the invention a current flow in the fibrous preform(s) can also be initiated during conveying of fibrous preforms, for example for preforming or for manufacturing fibrous-preform laminates by means of an electrode and a counter electrode, such that, on account thereof, thermal energy can be introduced into the fibrous preform. On account thereof, thermal energy can be introduced during a preforming step, so as to consolidate the preform, for example. It is also conceivable for thermal energy to be introduced during the construction of a fibrous-preform laminate, for example, in order to fix the plurality of layers of fibrous preform in relation to one another.

This has the advantage that a precisely defined thermal input can be introduced into the fibrous preform(s), leading to a quality-assured process.

Moreover, the thermal input is initiated during conveying of the fibrous preforms, shortening the process times of the entire production process. Finally, an advantage is to be seen therein that the thermal input is initiated when the latter is required within the process chain, for example during preforming for consolidating, or during the construction of the laminate for fixing.

In one advantageous embodiment, the fibrous-preform conveying device displays at least one further fibrous-preform contact roller, the at least one electric counter electrode, which is likewise connectable to the electric power source, being provided in the circumferential face thereof. In this manner, the contact roller having the electrode and the contact roller having the counter electrode may be disposed so as to be spaced apart in the conveying direction, such that in the event of contact a current flow in the fiber direction is initiated on one and the same fibrous-preform side. It is also conceivable for the contact roller having the electrode to contact the fibrous preform on a first side and the contact roller having the counter electrode to contact a fibrous preform to be conveyed on a second side which lies opposite the first side, such that a current flow through the fibrous preform(s) which is transverse to the fiber profile can also be initiated.

In one advantageous embodiment, a contact roller pair which displays a first contact roller and a second contact roller is provided. The first contact roller here contacts a fibrous preform to be conveyed on a first side, while the second contact-roller pair contacts a fibrous preform to be conveyed on a second side which lies opposite the first side, such that the preform to be conveyed is guided through between the two contact rollers.

In this manner, it is conceivable, for example, for the electrode to be disposed on the first contact roller of the contact-roller pair and the counter electrode to be disposed on the second contact roller, on account of which a current flow between the electrode and the counter electrode through the fibrous preform which is being guided through between the two contact rollers is initiated. However, it is also conceivable for both the first and also the second contact roller to display the electrode or the counter electrode, such that the contact-roller pair in its entirety forms either the electrode or the counter electrode. Here, the corresponding counterpart (counter electrode/electrode) can be implemented by means of a second contact-roller pair, for example.

In one further advantageous embodiment it is conceivable, for example, for a multiplicity of contact rollers which in their circumferential face display in each case at least one electrode to be provided. On account thereof, it becomes possible to ensure sufficient covering of the fibrous-preform area with contacted electrodes, in particular in the case of comparatively large fibrous preforms.

Of course, the exemplary embodiment may be seen to be alternative or additional in conjunction with the above exemplary embodiments, such that a plurality of contact-roller pairs are conceivable, for example, which in each case display two contact rollers which in each case display at least one electrode.

In one further advantageous embodiment it is conceivable for a plurality of contact rollers to be provided, wherein a first number of contact rollers display the electrodes and another number of contact rollers display the counter electrodes. On account of the corresponding arrangement of the contact rollers having the respective type of electrode a current flow in the fibrous preform can therefore be initiated in a targeted manner.

This exemplary embodiment is also to be seen to be alternative or additional to the preceding exemplary embodiments, such that a plurality of roller pairs in which the one roller displays the electrode or the other roller displays the counter electrode, for example, may be provided. However, it is also conceivable for a plurality of roller pairs to be provided, wherein a first number of roller pairs solely display the electrodes and another number of roller pairs solely display the counter electrodes, such that on account thereof a current flow in the fibrous preform in the fiber direction between the roller pairs having the electrode and the roller pairs having the counter electrodes is initiated.

In one further alternative or additional embodiment it is proposed that on one fibrous-preform contact roller a plurality of electric electrodes and/or counter electrodes which are isolated in relation to one another are provided. In this manner, it is conceivable, for example, for a plurality of electrodes or counter electrodes which are isolated in relation to one another to be provided on one contact roller, such that merely one roller is required in order to cover a comparatively large area of fibrous preforms. However, it is also conceivable for a contact roller which has precisely one electrode and precisely one counter electrode which are isolated in relation to one another in the circumferential face to be provided, such that a current flow in the fibrous preform between the electrode and the counter electrode of the contact roller is initiated. The current flow here is initiated so as to be transverse to the conveying direction of the fibrous preform to be conveyed. The current flow in the fibrous preform thus is initiated so as to be parallel with the axis of the contact roller.

It is very particularly advantageous here if the electrode and the counter electrode are in each case disposed on an end of the contact roller, such that a correspondingly larger defined portion in which the current flow is initiated can be defined.

In one further alternative or additional embodiment at least one contact roller is provided such that the at least one electrode and/or counter electrode which are/is provided in the circumferential face are/is configured so as to radially project in relation to the fibrous-preform contact roller. On account thereof, a relief-type circumferential face of the type of a pitted roller or a bowed roller, respectively, can be created, such that the transfer resistance in the region of the projecting electrodes and/or counter electrodes is reduced by way of compacting the fibers in these regions, leading to improved control of the current flow within the fibrous preform. This type of arrangement of the electrodes and/or counter electrodes in the circumferential face here is particularly suitable for bonding a plurality of fibrous-preform layers, since on account thereof a current flow is initiated in only a punctiform manner, in particular when the counter electrode bears on the side lying opposite the contacted side of the fibrous preform.

Moreover, it is advantageous and expedient when one or a plurality of the contact rollers are configured such that for compacting the fibers in the region of contact said contact rollers are configured for generating a contact force in the direction of the fibrous preforms to be conveyed. On account of compacting the fibers in the region of contact between the roller and the fibrous preform, the transfer resistance is reduced, facilitating a defined current flow in this region.

Finally, the fibrous-preform conveying device may be configured such that for conveying the fibrous preform in the respective conveying direction one or a plurality of the contact rollers is/are connected to a conveying drive.

In one further advantageous embodiment a power regulating unit which depending on a conveying speed is equipped to regulate the electric power of the current flow initiated in the fibrous perform is provided. A power regulating unit of this type may be provided in the electric power source, for example. In this manner, the electric power may be lower at comparatively low conveying speeds, for example, and be increased as the conveying speed increases. On account thereof, the advantage is achieved that a not too high energy input into the fibrous preform to be conveyed is initiated during the startup of the conveying device when indexing commences, which may lead to damage to the fibrous preforms. Rather, the electric power is regulated such that it is adapted to the conveying speed of the conveying device.

In one further advantageous embodiment the conveying device displays a plurality of electric electrodes and/or counter electrodes on one or a plurality of contact rollers, wherein an electrode control unit, which is equipped for successively applying an electric voltage to at least one of the electrodes (preferably to only one electrode at the same time) and for switching the remaining electrodes and/or counter electrodes in such a manner that a current flow between the respective electrode and/or a predetermined counter electrode is initiated, is provided. In this manner, a voltage is successively applied to each electrode, so as to initiate a current flow, wherein the respective remaining electrodes and counter electrodes are switched such that a current flow is initiated precisely between the electrode to which the voltage has been applied and a defined counter electrode. On account thereof, the advantage is achieved that temperature control which is sufficient and effective across a large area can be achieved in particular in the case of fibrous preforms having a large area. The electrodes here are switched in sequence, one after the other.

Moreover, for applying the voltage to the electrodes and/or counter electrodes, it is expedient for the electric power source to be connected to a control unit, such that the application of voltage to the electrodes and/or counter electrodes can be controlled in a corresponding manner. In this manner, it is conceivable, for example, for the control unit to be equipped such that the electric power source can be actuated such that the voltage can be applied separately to each electrode and/or counter electrode in a correspondingly individually defined manner. On account thereof, control patterns which, depending on the arrangement of the electrodes and/or counter electrodes, lead to various current flows within the fibrous preforms can be defined.

The invention will be explained in more detail in an exemplary manner by means of the appended drawings, in which.

Figure 1A:
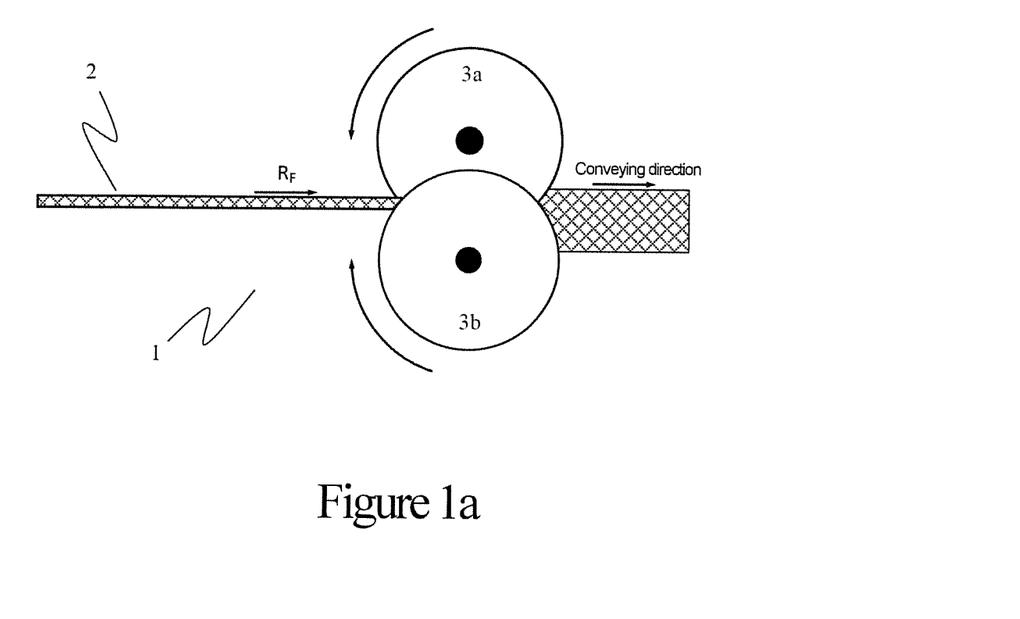
FIGS. 1a to 1c show a schematic illustration of a preforming installation.
Figure 1B:
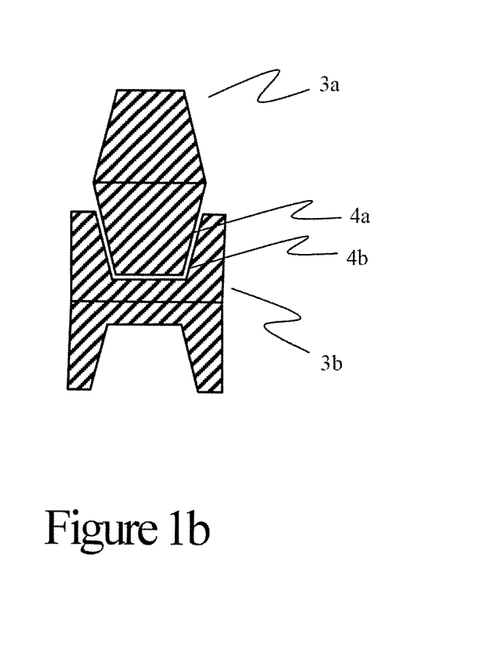
Figure 1C:
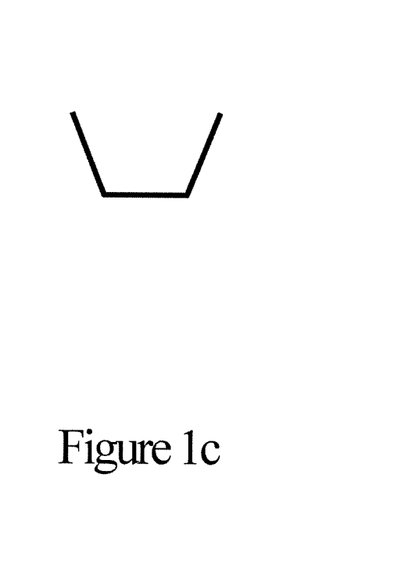

FIGS. 1a to 1c show in a schematic manner a preforming installation for forming fibrous preforms 2, seen from various perspectives. The preforming installation here in the widest sense is a conveying installation 1 by way of which the fibrous preform 2 is moved in the conveying direction $R_F$. The fibrous preform 2 is brought into the desired shape by means of two forming rollers 3a and 3b which are configured as a pair and display corresponding profiling to form the fibrous preforms 2, as is illustrated in FIG. 1c in the sectional view. With the aid of such a preforming installation 1, a U-profile can therefore be generated from a planar fibrous preform 2.

In FIG. 1b an axial sectional view of the forming rollers 3a and 3b is shown. The forming roller 3b here depicts a circumferential face 4b in a U-profile, which correspondingly communicates with the circumferential face 4a of the forming roller 3a such that a planar fibrous preform can be brought into the desired U-profile shape.

As will be discussed in more detail herebelow, according to the invention an electrode and/or counter electrode, which are/is disposed in the circumferential face 4a, 4b of the forming rollers 3a, 3b such that the electrode and/or counter electrode is in contact with the fibrous preform during the forming operation, are/is provided on one or both forming rollers 3a and 3b. On account thereof, a current flow in the fibrous preform 2 can be initiated during the forming operation such that, on account of the electric resistance of the fibrous preform 2, thermal energy can be introduced into the fibrous preform 2.

On account of the thermal input into the fibrous preform, the latter can be consolidated in terms of its shape, for example, by thermal activation of a binder material, for example, such that the desired preform shape as illustrated in FIG. 1c is fixed and is permanently present even after the preforming operation, without the fibrous preform losing its shape.

Figure 2A:
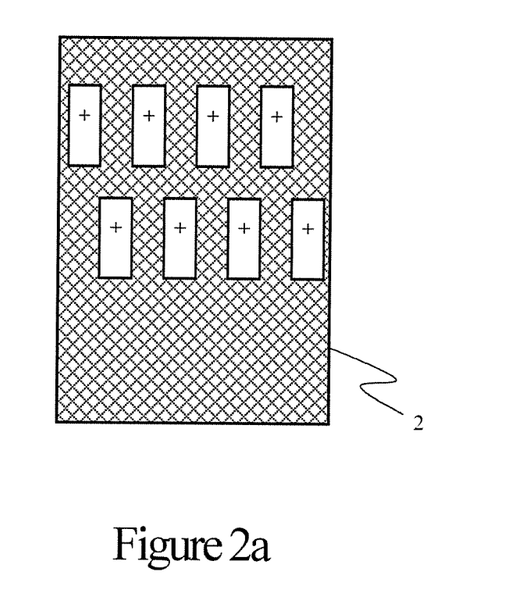
FIGS. 2a, 2b show a schematic illustration of a first variant.
Figure 2B:
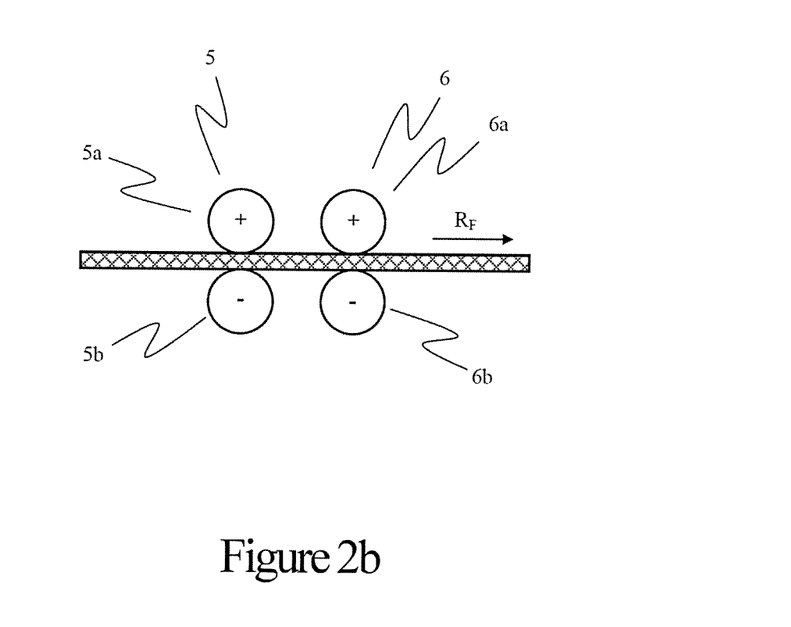

FIGS. 2a, 2b show in a schematic manner an illustration of a first variant of the arrangement of the electrodes and counter electrodes. For reasons of clarity, the electric power source is not illustrated. FIG. 2a here shows a plan view onto the fibrous preform 2 to be conveyed, with its contact rollers 3a, 3b, while FIG. 2b shows a lateral view.

In the exemplary embodiment of FIGS. 2a, 2b at least two roller pairs 5 and 6 which in each case display two contact rollers 5a, 5b, and 6a, 6b are provided. The upper contact rollers 5a and 6a of the roller pairs 5, 6 here display on their circumferential face the electrode, while the lower contact rollers 5b, 6b carry on their circumferential face the respective counter electrode.

At least in each case one contact roller of the two roller pairs 5, 6 here is configured such that the former imposes a force in the direction of the fibrous preform 2, such that the fibrous preform which is guided through between the respective contact rollers 5a, 5b, and 6a, 6b of the two roller pairs 5, 6 is compacted in the contact region, such that the fibers are subjected to corresponding compacting here. On account thereof, the transfer resistance is reduced, such that a current flow in the fibrous preform between the electrode and the counter electrode of the respective roller pair 5, 6 is initiated. In the exemplary embodiment of FIGS. 2a, 2b the current flow here is perpendicular to the fiber plane.

It is furthermore shown in the exemplary embodiment of FIGS. 2a, 2b that a plurality of rollers or roller pairs, respectively, of this type are provided in a separate manner, on account of which the fibrous preform 2 can be temperature controlled across a large area. However, it is also conceivable for the electrodes and/or counter electrodes to be provided in multiples on one and the same roller, wherein the electrodes and/or the counter electrodes are then disposed so as to be isolated in relation to one another. On account thereof, the complexity of the installation can be reduced.

It is furthermore indicated in the exemplary embodiment of FIGS. 2a, 2b that the roller pair 6 is connected to a corresponding conveying drive, such that the rollers 6a, 6b of the roller pair 6 are configured for conveying the fibrous preform 2 in the conveying direction.

Figure 3A:
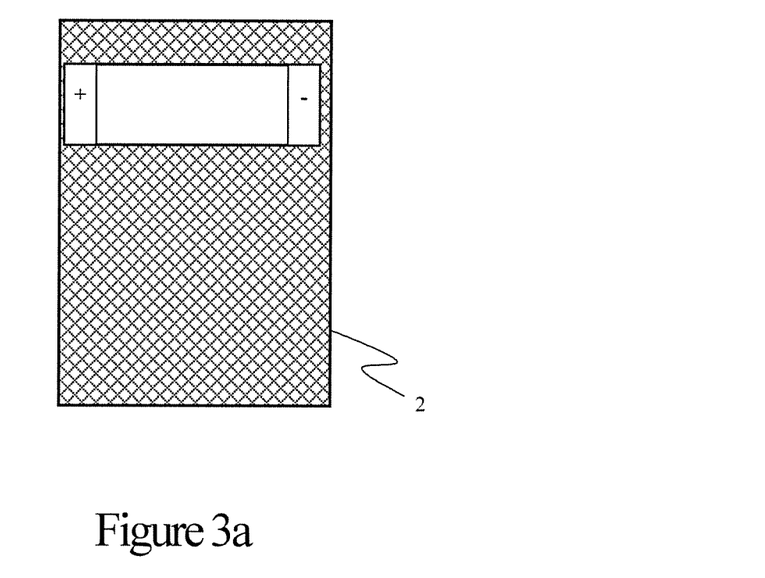
FIGS. 3a, 3b show a schematic illustration of a second variant.
Figure 3B:
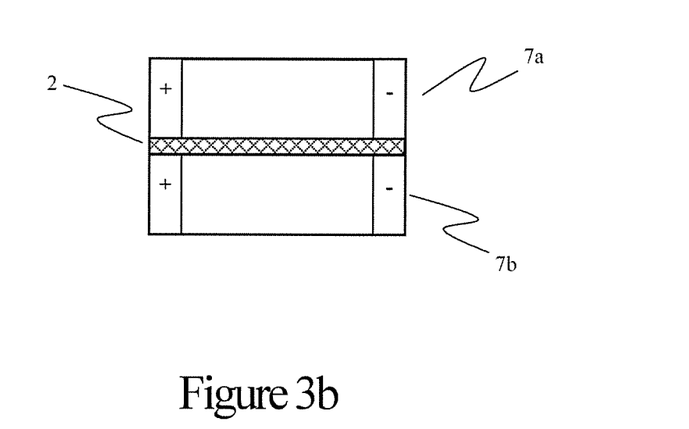

FIGS. 3a, 3b show in a schematic manner a second variant of the present invention. Here, a roller pair which displays a first contact roller 7a and a second contact roller 7b, between which the fibrous preform 2 is then guided through, is provided. Both the electrode and also the counter electrode here are in each case disposed so as to be spaced apart from one another on a contact roller 7a, 7b, on account of which a current flow which is transverse to the conveying direction is initiated in the fibrous preform. The electrode and the counter electrode here are provided so as to be isolated on the respective roller 7a, 7b.

Of course, it is conceivable here for not only one electrode and counter electrode to be provided, but for a plurality of electrodes and counter electrodes which are in each case alternatingly disposed along the roller, for example, to be provided.

Figure 4A:
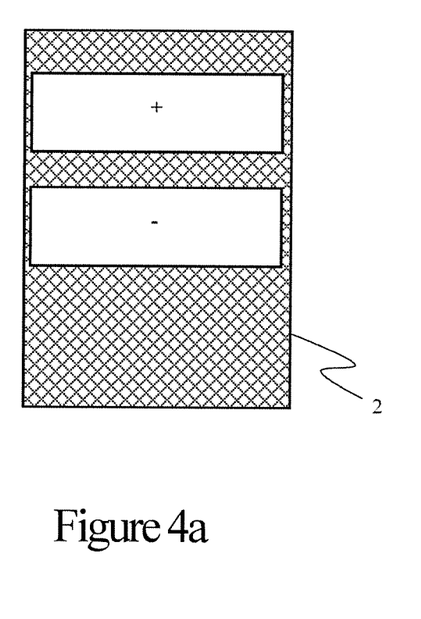
FIGS. 4a, 4b show a schematic illustration of a third variant.
Figure 4B:
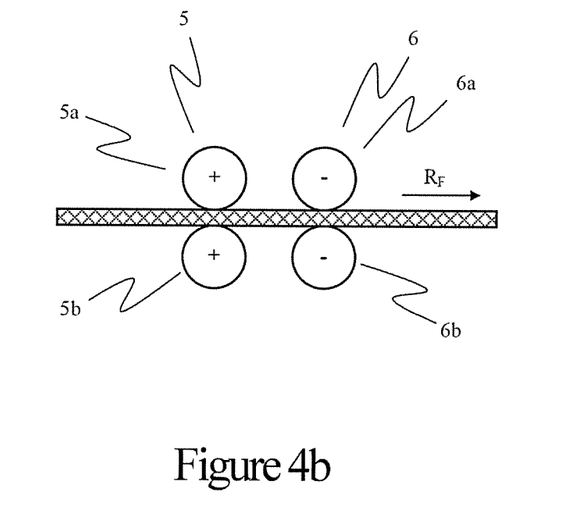

Furthermore, in FIGS. 4a, 4b a schematic illustration of a third variant is shown in which a roller pair 6, 7 which in each case displays two contact rollers 6a, 6b, and 7a, 7b is provided. The contact rollers 6a, 6b of the roller pair 6 here merely display the electrode, while the contact rollers 7a, 7b of the roller pair 7 display the counter electrode. The roller pairs 6 and 7 here are disposed so as to be spaced apart from one another, for example spaced apart in the conveying direction, such that a current flow in the fibrous preform between the roller pair 6 and 7 is initiated.

Figure 5A:
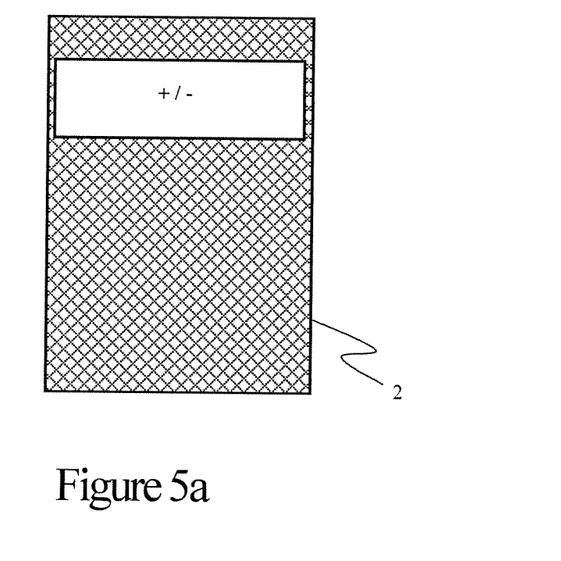
FIGS. 5a, 5b show a schematic illustration of a fourth variant.
Figure 5B:
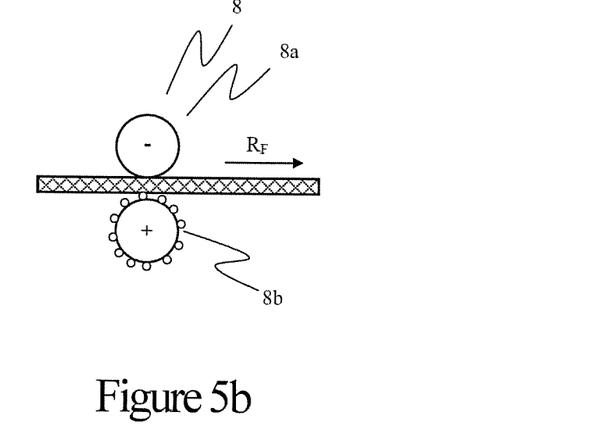

FIGS. 5a, 5b show in a schematic manner a fourth variant of the present invention, in which a roller pair 8 which is composed of two contact rollers 8a and 8b is provided. At least one of the contact rollers, in the exemplary embodiment here the contact roller 8b, is here configured such that the electrodes and/or counter electrodes are/is configured so as to radially project in relation to the roller, such that a type of bowed roller or pitted roller results. The individual bows or pits, i.e. the radially projecting electrodes and/or counter electrodes, here are distributed across the circumferential face such that a relief-type circumferential face of the contact roller 8a results. In the region of the pits or bows of the roller, respectively, the contact pressure is concentrated in a small area, such that intense compacting of the fibers is achieved in this region, as a result of which the transfer resistance in this region is reduced, leading to a defined current flow through a plurality of fiber layers, in particular.

Figure 6:
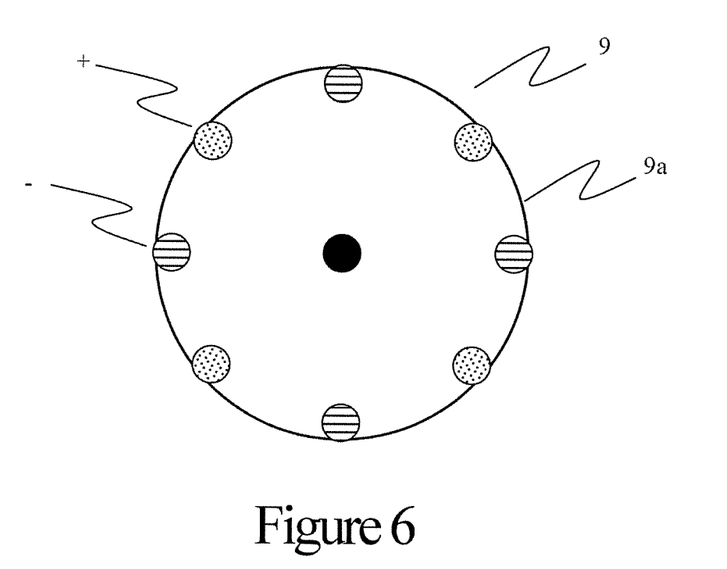
FIG. 6 shows a schematic illustration of a fifth variant.

Finally, FIG. 6 shows a fifth variant in which a contact roller 9 is illustrated, the electrodes and counter electrodes being distributed across the circumference of the circumferential face 9a of said contact roller 9, as is schematically indicated in the cross-sectional illustration of FIG. 6. Here, the electrode and the counter electrode are disposed on a roller 9 such that they are in each case disposed so as to be radially spaced apart on the roller, in contrast to the second variant of FIGS. 3a, 3b, where the counter electrode and the electrode are disposed so as to be axially spaced apart.

LIST OF REFERENCE SIGNS

1 Fibrous-preform conveying device
2 Fibrous preform
3a, 3b Profiled contact roller
4a, 4b Circumferential face of the respective contact roller 3a, 3b
$R_F$ Conveying direction
5, 6 Roller pair
5a, 5b Contact rollers of the roller pair 5
6a, 6b Contact rollers of the roller pair 6

7 Roller pair
7a, 7b Contact rollers of the roller pair 7
8 Roller pair
8a, 8b Contact rollers of the roller pair 8
9 Contact roller
9a Circumferential face of the contact roller 9
+ Electrode
− Counter electrode

The invention claimed is:

1. A fibrous-preform conveying device, comprising
a material marshaling installation for marshaling fibrous preforms to be conveyed;
a plurality of fibrous-preform contact rollers which include a plurality of electrodes and/or counter electrodes arranged on one or more circumferential faces of the contact rollers, wherein the circumferential faces are configured to bear on a fibrous preform to be conveyed; and
an electrode control unit for successively applying an electric voltage to at least one of the electrodes and for switching a remainder of the electrodes and/or counter electrodes in such a manner that a current flow between a respective electrode and a predetermined counter electrode is initiated,
wherein the plurality of electrodes are electrically isolated in relation to one another and to the counter electrodes, and wherein the plurality of electrodes and/or counter electrodes are connectable to an electric power source and the electrode control unit for applying an electric voltage,
wherein the plurality of electrodes form an arrangement, and wherein the electrode control unit is configured to apply the electric voltage separately to each electrode or counter electrode in an individually defined manner using control patterns which lead to various current flows within the fibrous preform to be conveyed.

2. The fibrous-preform conveying device according to claim 1, wherein the plurality of fibrous-preform contact rollers includes a pair of fibrous-preform contact rollers having a first fibrous-preform contact roller which with part of its circumferential face bears on a first side of a fibrous preform to be conveyed, and having a second fibrous-preform contact roller which with part of its circumferential face bears on a second side, opposite the first side, of a fibrous preform to be conveyed, such that the fibrous preform to be conveyed is guided through between the first fibrous-preform contact roller and the second fibrous-preform contact roller.

3. The fibrous-preform conveying device according to claim 1, wherein the plurality of fibrous-preform contact rollers are spaced apart from one another.

4. The fibrous-preform conveying device according to claim 1, wherein each fibrous-preform contact roller has at least one electrode which, for initiating the current flow, interacts with a corresponding counter electrode.

5. The fibrous-preform conveying device according to claim 1, wherein a first number of fibrous-preform contact rollers have in each case at least one electrode and a second number of fibrous-preform contact rollers have in each case at least one counter electrode.

6. The fibrous-preform conveying device according claim 1, wherein the plurality of electrodes and/or counter electrodes are configured in the circumferential face so as to radially project in relation to at least one fibrous-preform contact roller.

7. The fibrous-preform conveying device according to claim 1, wherein at least one of the fibrous-preform contact rollers is configured for imposing a force in the direction of the fibrous preform to be conveyed.

8. The fibrous-preform conveying device according to claim 1, wherein at least one of fibrous-preform contact rollers displays a drive for conveying the fibrous preforms to be conveyed.

9. The fibrous-preform conveying device according to claim 1, further comprising a power regulating unit which depending on a conveying speed is equipped to regulate the electric power of the current flow initiated in the fibrous preform.

10. The fibrous-preform conveying device according to claim 1, wherein the electrode control unit is configured to achieve temperature control across a large area of the fibrous preform to be conveyed by initiating changes in current flow direction, including between a fiber direction and a transverse-to-fiber direction.

* * * * *